US011379962B2

(12) United States Patent
Mimura et al.

(10) Patent No.: US 11,379,962 B2
(45) Date of Patent: Jul. 5, 2022

(54) IMAGE INSPECTION DEVICE AND IMAGE FORMING SYSTEM

(71) Applicant: KONICA MINOLTA, INC., Tokyo (JP)

(72) Inventors: Yusuke Mimura, Hino (JP); Makoto Oki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 223 days.

(21) Appl. No.: 16/242,367

(22) Filed: Jan. 8, 2019

(65) Prior Publication Data
US 2019/0220970 A1    Jul. 18, 2019

(30) Foreign Application Priority Data

Jan. 18, 2018  (JP) .............................. JP2018-006563

(51) Int. Cl.
*G06T 7/00*    (2017.01)
*H04N 1/00*    (2006.01)
*G06T 7/33*    (2017.01)

(52) U.S. Cl.
CPC .............. *G06T 7/0002* (2013.01); *G06T 7/33* (2017.01); *H04N 1/00005* (2013.01); *G06T 2207/30141* (2013.01)

(58) Field of Classification Search
CPC ......... G06T 7/0002; G06T 2207/30141; G06T 7/33; H04N 1/00005
See application file for complete search history.

(56) References Cited

U.S. PATENT DOCUMENTS

2011/0286659 A1* 11/2011 Saeki ................... G06T 7/001
                                                       382/152
2012/0070040 A1*  3/2012 Vans .................. H04N 1/00015
                                                       382/112

(Continued)

FOREIGN PATENT DOCUMENTS

JP          2004094438        3/2004
JP          2010249565       11/2010
(Continued)

OTHER PUBLICATIONS

Notice of Reasons for Refusal issued in corresponding Japanese Patent Application No. 2018-006563, dated Oct. 5, 2021, with English Translation (9 pages).

(Continued)

*Primary Examiner* — Kevin Ky
(74) *Attorney, Agent, or Firm* — Buchanan Ingersoll & Rooney PC

(57) ABSTRACT

An image inspection device that determines a defect in an image of a surface to be inspected of a printed matter, based on a comparison between a captured image obtained by capturing the surface to be inspected and a master image includes a hardware processor that acquires the captured image and the master image, wherein the hardware processor: acquires region information about an image in a region having a predetermined area; specifies a processing technique of image alignment for each region in relation to the region information; executes at least an alignment process in relation to the region information as a process before the comparison by the specified alignment technique; and compares the captured image and the master image, on which the process before the comparison has been performed, and performs defect determination as to whether there is a defect in the captured image based on a comparison result.

23 Claims, 11 Drawing Sheets

(56) References Cited

U.S. PATENT DOCUMENTS

| | | | |
|---|---|---|---|
| 2015/0326798 A1* | 11/2015 | Muto | G06T 7/30 |
| | | | 348/239 |
| 2017/0171407 A1* | 6/2017 | Akiyama | G06K 9/348 |
| 2017/0360531 A1* | 12/2017 | Janzadeh | G16H 10/60 |
| 2018/0204374 A1* | 7/2018 | Isobe | G06T 17/00 |
| 2019/0073779 A1* | 3/2019 | Iwase | A61B 3/102 |
| 2019/0102643 A1* | 4/2019 | Furukawa | H04N 5/147 |
| 2019/0180446 A1* | 6/2019 | Medoff | G06K 9/6223 |

FOREIGN PATENT DOCUMENTS

| | | |
|---|---|---|
| JP | 2013-123812 | 6/2013 |
| JP | 2014000996 A | 1/2014 |
| JP | 2014055852 A | 3/2014 |

OTHER PUBLICATIONS

Notice of Reasons for Refusal issued in corresponding Japanese Patent Application No. 2018-006563, dated Feb. 8, 2022, with English Translation (8 pages).

* cited by examiner

IMAGE INSPECTION DEVICE AND IMAGE FORMING SYSTEM

The entire disclosure of Japanese patent Application No. 2018-006563, filed on Jan. 18, 2018, is incorporated herein by reference in its entirety.

BACKGROUND

Technological Field

The present invention relates to an image inspection device and an image forming system capable of determining a defect in an image of a printed matter.

Description of the Related Art

In image forming devices, a method of forming an image on a sheet based on image data to output a printed matter, and inspecting the output result is known. In this inspection, an image of the printed matter is captured, the captured image obtained by capturing is compared with a previously prepared correct image, and a difference therebetween is extracted to determine whether there is a defect in the captured image. As a correct image, it is possible to use a scanned image of the printed matter that has been verified as OK by finished product check, a raster image processor (RIP) image used for printing, or the like.

At the time of inspection, although the captured image and the correct image are aligned before extracting the difference between the two images, the following difficulties occur.

Due to misalignment, the difference becomes large and erroneously detected as a defect.

The variation of the pixels of each image becomes large because of the influence of resolution conversion and, even if the positions are aligned, the difference becomes large and erroneously detected.

In order to prevent these difficulties, as disclosed in JP 2014-55852 A, a method has been proposed in which a threshold value of a defect at an edge portion of an image is increased to prevent erroneous detection. Alternatively, as in JP 2014-00996 A, a method of performing high-precision alignment that extracts feature points of an image has been proposed.

However, the method proposed in JP 2014-55852 A has a difficulty in that the sensitivity to a defect near the edge is lowered. Furthermore, in the method proposed in JP 2014-00996 A, there is a difficulty that the entire image is processed and the processing speed becomes slower.

SUMMARY

In response to the above problems, it is an object of the present invention to provide an image inspection device and an image forming system capable of performing high-precision inspection without reducing the processing speed.

To achieve the abovementioned object, according to an aspect of the present invention, there is provided an image inspection device that determines a defect in an image of a surface to be inspected of a printed matter, based on a comparison between a captured image obtained by capturing the surface to be inspected and a master image, and the image inspection device reflecting one aspect of the present invention comprises:

a hardware processor that acquires the captured image and the master image, wherein the hardware processor:

acquires region information about an image in a region having a predetermined area from the captured image and the master image;

specifies a processing technique of image alignment for each region in relation to the region information;

executes at least an alignment process in relation to the region information as a process before the comparison by the specified alignment technique; and compares the captured image and the master image, on which the process before the comparison has been performed, and performs defect determination as to whether there is a defect in the captured image based on a comparison result.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
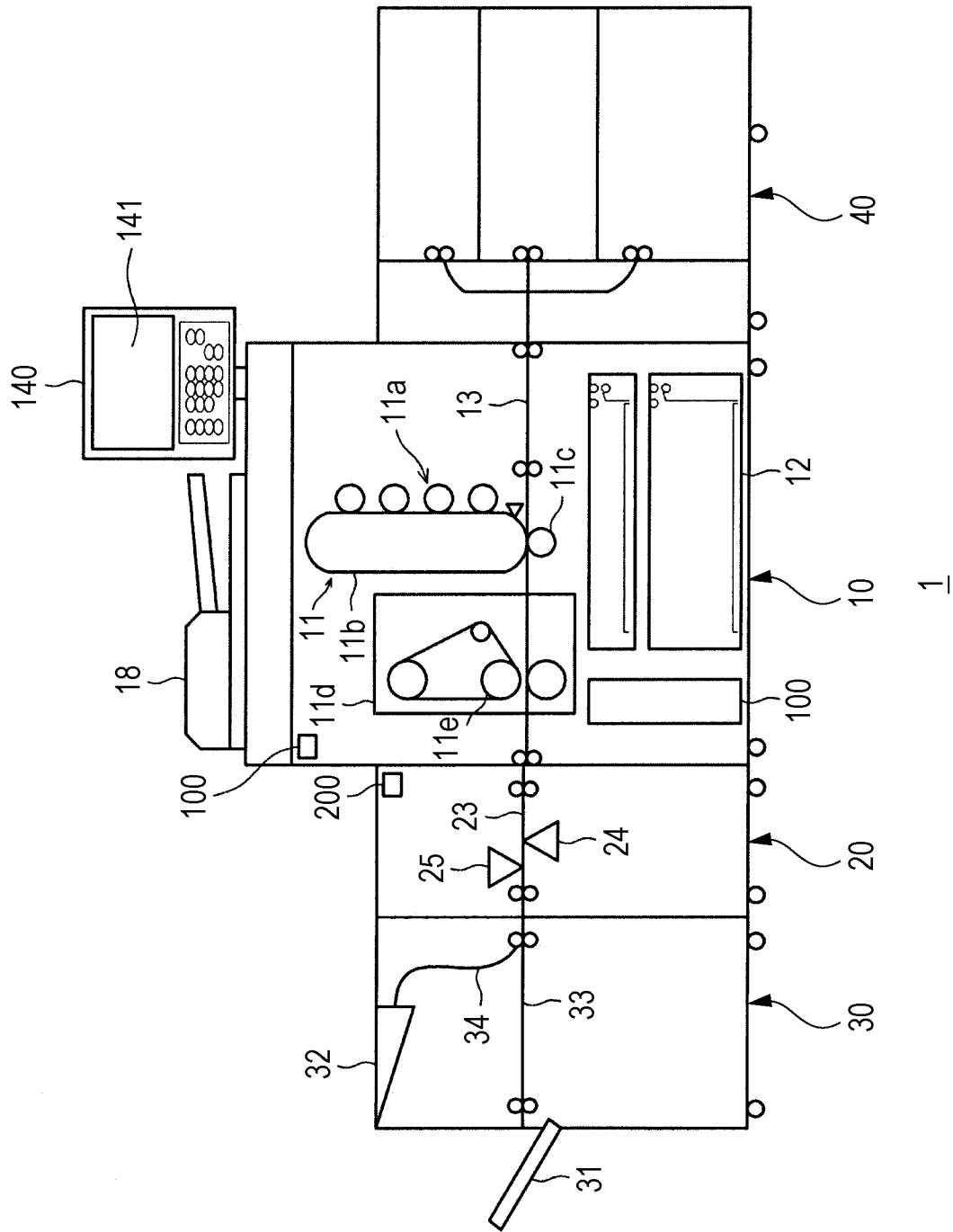
FIG. 1 is a diagram illustrating an outline of a mechanical configuration of an embodiment of the present invention.

As illustrated in FIG. 1, an image forming system 1 has an image forming device 10 that forms an image, and a sheet feeding device 40 is connected to the preceding stage of the image forming device 10. A reading device 20 is connected to the subsequent stage of the image forming device 10, and a post-processing device 30 is connected to the subsequent stage of the reading device 20. Each device and device main body are electrically and mechanically connected and communication and sheet conveyance are possible between respective devices.

This embodiment assumes that the image forming system 1 is constituted by the image forming device 10, the sheet feeding device 40, the reading device 20, and the post-processing device 30. However, the image forming system may be constituted only by the image forming device 10, or may be constituted by adding other devices to the image forming device 10; alternatively, the image forming system may be constituted only by the reading device 20.

Furthermore, the image forming device 10 may correspond to an image inspection device of the present invention, or may constitute the image inspection device together with the reading device 20 and the like. Additionally, in a case where an image inspection and the like are performed in the reading device 20, the reading device 20 may constitute the image inspection device.

The sheet feeding device 40 is provided with a plurality of sheet feed stages and sheets are accommodated in each sheet feed stage. The sheets accommodated in the sheet feed stages can be supplied to the image forming device 10 installed at the subsequent stage. The sheet corresponds to a recording medium. The material of the recording medium is not limited to paper and may be made of cloth, plastic, or the like. A printed matter of the present invention is one obtained by outputting a recording medium after an image is formed thereon.

In the image forming device 10, a main body sheet feeder 12 provided with a plurality of sheet feed trays is arranged on a lower side in a casing. In the main body sheet feeder 12, sheets are accommodated in each sheet feed tray. The sheet corresponds to the recording medium of the present invention, and the material thereof is not limited to paper and may be made of cloth or plastic.

A conveyance path 13 is prepared within the casing of the image forming device 10 and the sheet supplied from the sheet feeding device 40 or the main body sheet feeder 12 is conveyed to a downstream side along the conveyance path 13.

An image former 11 that forms an image on the sheet is prepared near the middle of the conveyance path 13.

The image former 11 has photoconductors 11a for each color (cyan, magenta, yellow, and black) and a charger, a laser diode (LD), a developer, a cleaner, and the like (not illustrated) are provided around the photoconductors 11a. The image former 11 also has an intermediate transfer belt 11b at a position where the intermediate transfer belt 11b makes contact with the photoconductors 11a for each color. The intermediate transfer belt 11b makes contact with the sheet on the conveyance path 13 at a secondary transferer 11c prepared in the middle of the intermediate transfer belt 11b. In addition, a fixer 11d including a fixing roller 11e is provided at a position on the downstream side of the secondary transferer 11c on the conveyance path 13.

In the case of forming an image on the sheet, after the photoconductors 11a are uniformly charged by the charger, the photoconductors 11a are irradiated with a laser beam from the laser diode (LD) or the like and latent images are formed on the photoconductors 11a. The latent images on the photoconductors 11a are developed by the developer to toner images, the toner images on the photoconductor 11a are transferred to the intermediate transfer belt 11b, and the image on the intermediate transfer belt 11b is transferred onto the sheet at the secondary transferer 11c. The image is fixed by the fixer 11d on the sheet conveyed along the conveyance path 13 after the image is formed thereon.

In this embodiment, the image former 11 has been described as forming a color image. However, in the present invention, the image former 11 may form an image in monochrome in black or the like.

Image formation on both sides of the sheet may be enabled by preparing a reverse conveyance path in front of and behind the image former 11 and performing reversal conveyance of the sheet.

Furthermore, the image forming device 10 is provided with an operation unit 140 on a top portion of the casing. The operation unit 140 has a liquid crystal display (LCD) 141 provided with a touch panel, and a group of operation keys, such as a numeric keypad, so as to be able to display information and accept operation input. The operation unit 140 serves as both of a display and an operation unit.

In this embodiment, the operation unit 140 is constituted by integrating the operation unit and the display, but the operation unit and the display may not be integrated. For example, the operation unit may be constituted by a mouse, a tablet, a terminal, or the like. In addition, the LCD 141 may be movable.

An automatic document feeder (ADF) 18 is provided on a top portion of the casing of the image forming device 10 at a place where the operation unit 140 is not located. The automatic document feeder (ADF) 18 automatically feeds a document set on a document table and a document fed by the automatic document feeder (ADF) 18 is read by a scanner 130 illustrated in FIG. 2.

A document on a platen glass (not illustrated) can also be read.

In the scanner 130, it is also possible to set a printed matter output from the image forming system 1 to perform reading. For example, a sheet on which a printing image or an adjustment image is formed is set and read, such that a read image, that is, a captured image can be acquired. In this case, the scanner 130 corresponds to an image reader.

Furthermore, the image forming device 10 has an image control part 100. The image control part 100 controls the entire image forming system 1 and is constituted by a central processing unit (CPU), a memory, and the like. Note that the image control part 100 may be prepared outside the casing of the image forming device. Programs activated by the CPU include a program executed by a control part of the present invention.

The reading device 20 has a conveyance path 23 and the sheet introduced from the image forming device 10 is conveyed along the conveyance path 23. The downstream side of the conveyance path 23 is connected to the post-processing device 30 at the subsequent stage.

An image reader 24 that reads an image on a lower surface of the sheet conveyed through the conveyance path 23 and an image reader 25 that reads an image on an upper surface of that sheet are provided near the middle of the conveyance path 23, where the image reader 24 is positioned on the upstream side of the image reader 25.

The image readers 24 and 25 can be constituted by a line sensor such as a charge coupled device (CCD) sensor or a complementary metal oxide semiconductor (CMOS) sensor, and are capable of reading an image of the sheet conveyed through the conveyance path 23 over the entire direction intersecting with a conveyance direction. A reading result read by the image reader 24 or the image reader 25 is provisionally sent to a reading control part 200 provided in the reading device 20 as a captured image and transmitted from the reading control part 200 to the image control part 100. The image control part 100 can determine whether there is a defect based on a comparison between the captured image and a master image. The captured image may be obtained by reading one side of the sheet, or may be obtained by reading both sides of the sheet. In this example, the image control part 100 functions as the control part of the present invention.

Note that, in this embodiment, it is possible to read images of the front and back sides of the sheet by the two image readers, but the number of the image readers is not particularly limited. A single image reader may be employed and images of the front and back sides of the sheet may be read by the single image reader by preparing a reverse conveyance path in front of and behind the image reader and performing reverse conveyance of the paper.

In this embodiment, the reading result is transmitted to the image control part 100 such that the image control part 100 can determine whether there is a defect in the image, but the reading control part 200 provided in the reading device 20 may determine whether there is a defect in the image. The determination result can be transmitted to the image control part 100. In this case, the reading control part 200 functions as the control part of the present invention.

The post-processing device 30 has a conveyance path 33 and conveys the sheet introduced from the reading device 20 to the downstream side. A post-processor (not illustrated) is provided in a central part of the conveyance path 33. The post-processor can execute predetermined post-processes; for example, the post-processor can perform a stapling process and a punching process and moreover, can perform a post-process including folding, such as inner triple folding, saddle stitching, Z-folding, gate folding, and quarter folding. The post-processor may perform a plurality of post-processes.

Furthermore, a conveyance path 34 is branched off from the conveyance path 33 in the middle of the conveyance path 33. The conveyance path 33 is connected to a first sheet discharger 31, whereas the conveyance path 34 is connected to a second sheet discharger 32.

The sheet on which the post-process has been performed is discharged to the first sheet discharger 31, while the sheet on which the post-process has not been performed is discharged to the second sheet discharger 32. Furthermore, when it is determined that there is a defect in the image on the sheet, the sheet having a defect in the image may be discharged to a discharge destination different from the normal discharge destinations.

A sheet on which the post-process is not to be performed may be discharged to the second sheet discharger 32.

Furthermore, although the image forming system 1 is provided with the reading device 20, the reading device 20 may be provided within the casing of the image forming device; additionally, the image forming device and the reading device may not be mechanically connected. The image forming system of the present invention may have the image reader or may not have the image reader. Additionally, the image forming system of the present invention may be provided with the image former, or alternatively, an image forming system not provided with the image former may be regarded as the image forming system.

Figure 2:
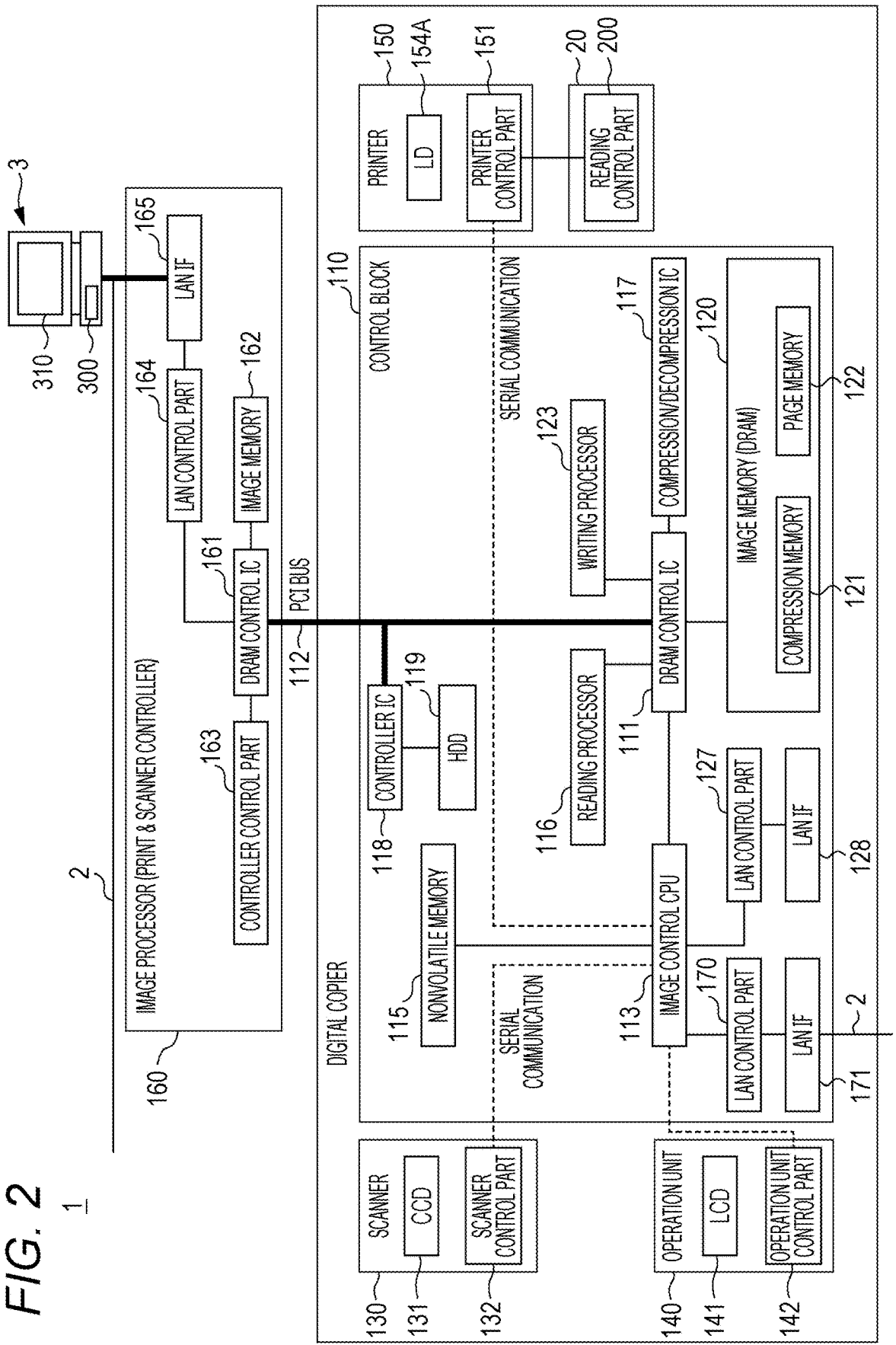
FIG. 2 is, similarly to above, a control block diagram.

Next, an electrical configuration of the image forming system 1 will be described with reference to FIG. 2.

The image forming system 1 has a digital copier and an image processor (print & scanner controller) 160 in the image forming device 10 as main configurations. The digital copier has a control block 110, the scanner 130, the operation unit 140, and a printer 150. The image processor (print & scanner controller) 160 processes image data input from and output to an external device.

The control block 110 has a peripheral component interconnect (PCI) bus 112. A dynamic random access memory (DRAM) control integrated circuit (IC) 111 in the digital copier is connected to the PCI bus 112 and an image control CPU 113 is connected to the DRAM control IC 111. A hard disk drive (HDD) 119 is also connected to the PCI bus 112 via a controller IC 118.

A nonvolatile memory 115 is connected to the image control CPU 113. Programs executed by the image control CPU 113, setting data such as machine setting information, a process control parameter, and the like are retained in the nonvolatile memory 115 and the HDD 119.

Additionally, programs and parameters for executing a procedure of recognizing the outer edge of the sheet based on the reading result obtained by reading the sheet, a procedure and a threshold value that determine whether two opposing sides of the sheet are parallel, a procedure of working out a density change on the read image, and the like are retained in the nonvolatile memory 115 and the HDD 119. A sheet profile is also recorded in the nonvolatile memory 115 and the HDD 119 and, in the sheet profile, information such as the sheet size and the basis weight associated with the sheet type is recorded. Note that these programs and parameters may be retained in a portable removable storage medium.

The image control CPU 113 is capable of grasping the entire state of the image forming system 1 by executing the program and controlling the image forming system 1 and can perform control of actions such as sheet conveyance and image formation, processes on image data for image formation, and the like. In this embodiment, the image control CPU 113 and the programs activated by the image control CPU 113 constitute the image control part 100 and, in this embodiment, the image control part 100 functions as the control part of the present invention. The program may be retained in the HDD 119 or the like as well as the nonvolatile memory 115 or may be retained in a portable storage medium.

The image control part 100 determines a defect in the image based on the captured image. Details of the determination will be described later.

Additionally, a scanner control part 132 of the scanner 130 is connected to the image control CPU 113 so as to enable serial communication.

The scanner 130 is provided with a CCD 131 and the scanner control part 132. The CCD 131 can optically read an image on the sheet. The scanner control part 132 controls the entire scanner 130 and controls reading of an image by the CCD 131, and the like. The scanner control part 132 is connected to the image control CPU 113 so as to enable serial communication and is under the control of the image control CPU 113. The scanner control part 132 can be constituted by a CPU, a program that activates the CPU, and the like.

Image data read by the CCD 131 is transmitted to a reading processor 116 via the DRAM control IC 111 and a process such as predetermined correction is carried out in the reading processor 116.

The operation unit 140 is provided with the touch panel type LCD 141 and an operation unit control part 142. Various types of information can be displayed and operations can be input on the LCD 141. Operations can also be input by operation keys and the like.

In the operation unit 140, it is possible to make settings and action commands for the image forming device 10. In the operation unit 140, it is further possible to make settings of a machine state, image formation conditions, and the like and, for example, a fixing temperature and a fixing pressure contact force can be set. Furthermore, the operation unit 140 may make a notification when a wrinkle on the sheet is found.

In the operation unit 140, various types of settings can be made for the image forming device 10, the reading device 20, the post-processing device 30, and the like by operation input through the LCD 141 and operation keys. Based on the setting, the control part can control actions such as image formation, sheet conveyance, start of job output, image defect determination, post-processes, and the like.

The operation unit control part 142 controls the entire operation unit 140. The operation unit control part 142 is connected to the image control CPU 113 so as to enable serial communication and the operation unit control part 142 controls the operation unit 140 upon acceptance of a command from the image control CPU 113. The operation unit control part 142 can be constituted by a CPU, a program that activates the CPU, and the like.

An image memory (DRAM) 120 is connected to the DRAM control IC 111. The image memory (DRAM) 120 is constituted by a compression memory 121 and a page memory 122, in which image data acquired by the scanner 130 and image data acquired from an external device through a network 2 can be retained as job data, and image data of a job to be printed can be retained in the image memory (DRAM) 120.

The image memory (DRAM) 120 has the compression memory 121 and the page memory 122.

Compressed image data is retained in the compression memory 121, while uncompressed page image data for image formation is temporarily retained in the page memory 122.

Furthermore, under the control of the DRAM control IC 111 described above, image data relating to a plurality of jobs can be saved in the image memory (DRAM) 120 and additionally, job setting information, reserved job image data, and the like can be saved therein. These pieces of data can also be retained in the HDD 119.

A compression/decompression IC 117 is connected to the DRAM control IC 111. The compression/decompression IC 117 can compress the image data and decompress the compressed image data.

A writing processor 123 is additionally connected to the DRAM control IC 111. The writing processor 123 processes data for use in the image forming action in an LD 154A.

A local area network (LAN) control part 127 is connected to the image control CPU 113 and a LAN interface 128 is connected to the LAN control part 127. The network 2 and other networks can be connected to the LAN interface 128 and data can be received from and transmitted to an external device via the LAN interface 128.

A DRAM control IC 161 of the image processor (print & scanner controller) 160 is also connected to the PCI bus 112.

In the image processor (print & scanner controller) 160, an image memory 162 configured from a DRAM is connected to the DRAM control IC 161 and a controller control part 163 is connected to the DRAM control IC 161. A LAN control part 164 is additionally connected to the DRAM control IC 161 and a LAN interface 165 is connected to the LAN control part 164. The LAN interface 165 is connected to the network 2.

A LAN control part 170 is also connected to the image control CPU 113 and a LAN interface 171 is connected to the LAN control part 170. The LAN interface 171 is connected to the network 2.

A printer control part 151 of the printer 150 is additionally connected to the image control CPU 113. The printer control part 151 is constituted by a CPU, a storage, and the like and controls the entire printer 150 and an image forming action by the LD 154A upon acceptance of a command from the image control CPU 113. The LD 154A collectively refers to LDs for each color. In addition, the printer control part 151 can control the image former 11 and a conveyer including the conveyance path 23.

Furthermore, the reading control part 200 of the reading device 20 is controllably connected to the printer control part 151.

As described above, the reading control part 200 controls the entire reading device 20 and controls the reading of the image readers 24 and 25 in the control thereof. The reading control part 200 transmits information about the captured image, which is a reading result, to the image control part 100 such that the image control part 100 can determine whether there is a defect in the image. However, as described earlier, the reading control part 200 may acquire the reading result to determine whether a defect has occurred in the image. A determination technique similar to a case where the image control part 100 makes determination can be employed. In this case, the reading control part 200 corresponds to the control part of the present invention.

An external device 3 and the like are connected to the network 2. In the image forming system 1, it is possible to transmit and receive data to and from the external device 3 and the like through the network 2. The network 2 may be used as a wide area network (WAN), a telephone line, and the like besides a LAN and whether the network 2 is wireless or wired is not of concern.

The external device 3 has an external device control part 300 that controls the entire external device 3.

The external device control part 300 can be constituted by a CPU, a program that activates the CPU, a storage, and the like. The external device 3 also has an external operation unit 310 capable of displaying information.

The external device 3 can also be used as a terminal or a device that manages the image forming system 1. When the external device 3 is used as a terminal, the external device 3 is connected to the LAN interface 165 via the network 2. When the external device 3 is used as a device that manages the image forming system 1, the external device 3 is connected to the LAN interface 171 via the network 2.

When the image forming system 1 is managed by the external device 3, the external device control part 300 functions as a management control part that manages the image forming system 1.

When the external device 3 is used as a management device, the external operation unit 310 can display management information, image defect determination, and the like and enables operation input as desired. In this case, the external operation unit 310 can be used as the operation unit of the present invention.

When managing the image forming system, the external device 3 may directly control the image forming system or may instruct the image forming system on control contents such that the control part of the image forming device exercises control according to these instruction contents.

In the external device 3, it is also possible to acquire the captured image which is a sheet reading result to determine whether there is a defect in the image. In this case, the external device 3 functions as a part constituting the image forming system 1 and the external device control part 300 functions as the control part of the present invention. Therefore, the external device 3 may be used as the image inspection device of the present invention.

A program activated by these forms of the external device control part 300 corresponds to the program executed by the control part. The external operation unit 310 can be used as the operation unit of the present invention.

Next, the basic action of the image forming system 1 will be described.

First, a procedure of accumulating image data in the image forming system 1 will be described. When the scanner 130 reads the image of a document to generate image data, the document is put on the scanner 130 and the image of the document is optically read by the CCD 131. In this case, the scanner control part 132 that has accepted a command from the image control CPU 113 controls the action of the CCD 131.

The image read by the CCD 131 is sent to the reading processor 116 and the reading processor 116 carries out a predetermined data process. The image data on which the data process has been performed is sent out to the compression/decompression IC 117 to be compressed by a predetermined method in the compression/decompression IC 117 and retained in the compression memory 121 or the HDD 119 via the DRAM control IC 111.

The image data retained in the compression memory 121 or the HDD 119 can be managed as a job by the image control CPU 113. When image data is managed as a job, printing conditions are retained in association with the image data in the image memory (DRAM) 120 and the HDD 119.

The print image data and the printing conditions may be separately retained in different storage media as long as the both are associated with each other. The printing conditions may be set by a user through the operation unit 140 or may be automatically set depending on initial settings or an action status.

On the other hand, when the image data is acquired from the outside, for example, when the image data is acquired from the external device 3 or the like through the network 2, the image data is received via the LAN interface 165 of the image processor (print & scanner controller) 160. The received image data is retained in the image memory 162 via the LAN interface 165, the LAN control part 164, and the DRAM control IC 161.

Thereafter, the image data retained in the image memory 162 is provisionally retained in the page memory 122 via the DRAM control IC 161, the PCI bus 112, and the DRAM control IC 111.

When the image data is page description data, the image data can be transformed into a raster image by a RIP process performed on the image data by the controller control part 163.

Print data retained in the page memory 122 is sequentially sent to the compression/decompression IC 117 via the DRAM control IC 111 to be subjected to the compression process and retained in the compression memory 121 via the DRAM control IC 111. In addition, in the case of retaining in the HDD 119, the print data is retained in the HDD 119 via the DRAM control IC 111 and the controller IC 118. These pieces of print data are managed by the image control CPU 113 in the same manner as described above. The image memory (DRAM) 120 and the HDD 119 serve as storages in which image data is saved.

When the image forming system 1 is used as a copying machine, information such as printing conditions (print mode) set on the operation unit 140 is notified to the image control CPU 113 such that the image control CPU 113 creates setting information. The created setting information can be retained in a random access memory (RAM) in the image control CPU 113.

When the image forming system 1 is used as a printer, the printing conditions can be set with a printer driver in the external device 3. As in the case of the image, the printing conditions set here are transferred to the external device 3, the LAN IF 165, the image memory 162, the DRAM control IC 161 (controller), the DRAM control IC 111 (main body), and the page memory 122 in this order and retained in the page memory 122.

When an image is output by the image forming system 1, that is, when the image forming system 1 is used as a copying machine or a printer, image data retained in the compression memory 121, the nonvolatile memory 115, the HDD 119, and the like are sent out to the compression/decompression IC 117 via the DRAM control IC 111 and the image data is decompressed. The decompressed image data is sent out to the writing processor 123 via the DRAM control IC 111 so as to be repeatedly extended for the LD 154A by the writing processor 123 in accordance with the set printing conditions and the LD 154A writes the extended image data to each photoconductor based on the image data. The images written on the photoconductors 11a thereafter undergo development, transfer, fixing, and the like and then are fixed on the sheet.

The sheet output by the image forming device 10 is sent to the reading device 20. When reading is set to be performed, the sheet is read by one or both of the image readers 24 and 25 and a captured image is transmitted to the image control part 100.

The sheet that has been read is sent to the post-processing device 30 and immediately discharged or post-processed and discharged according to the post-processing setting.

Next, the image defect determination in the control part will be described in detail.

Region information in a region having a predetermined area is acquired in the captured image and the master image of the sheet. Normally, the region information is acquired for each region of the entire image. For each of these regions, an alignment technique for the captured image and the master image according to the region information is specified and, as necessary, an image processing technique is specified. These techniques are specified depending on information on the image and RIP information, furthermore, user's designation and the like. Note that a scanned image of the printed matter that has been verified as OK by finished product check, a RIP image used for printing, or the like can be used as the master image and generally, an image called a correct image is used.

The control part can read the alignment technique and the image processing technique specified according to the information on the image or the like from the storage or the like. That is, the information on the image and the RIP information can be retained in the storage in advance in association with the content of the techniques. For specifying the technique, it is possible to make an association in terms of whether the technique is highly precise or a high-speed process.

In inspection of printed images, the most difficult part is the edge of the image. Erroneous detection tends to occur near the edge due to difficulties such as "positional shift", "blur near the edge", and "chromatic aberration at the time of capturing". In addition, generally, since a printing inspection device is required to have a high processing speed, processing is performed after converting the resolution to low resolution and the above-described difficulties occur more conspicuously. For this reason, conventionally, in general, a threshold value for determining a defect is raised near the edge to avoid erroneous detection from being frequently produced, but sensitivity to a defect near the edge is reduced because the threshold value is raised. In the present embodiment, it is possible to determine whether to align positions with high precision for each region or select a high-speed technique so as not to reduce the processing speed, while maintaining the sensitivity to a defect near the edge.

For example, criteria for determination include whether or not there are many edges, there are many characters in the description contents (there are many edges), and there is a range that the user wishes to intensively look into (position designation, a printed matter easy to notice as in the case of a business card, and the like). In these cases, a process with higher precision is required rather than the high-speed process. At this time, it is arbitrary to select which criterion and the present invention is not particularly limited. For cases other than these cases, the high-speed process may be requested.

As a high-definition alignment technique, there are sub-pixel alignment, rotation/expansion correction, and the like. As a high-speed alignment technique, there are techniques such as pixel alignment and omission of alignment in the case of movement only in XY or the same color. In the high-speed alignment, the blank region may be set not to be aligned.

Examples of image processing methods other than alignment include resolution conversion and color conversion. High-definition image processing techniques include resolution conversion techniques such as bilinear, bicubic, and non-reduction in resolution. Meanwhile, high-speed image processing techniques include a resolution conversion technique such as nearest neighbor. In the present invention, resolution conversion or color conversion may not be performed as the image processing method.

Furthermore, the order of image alignment and resolution conversion may be altered depending on which one of the high-precision process and the high-speed process is employed. When the high-precision process is performed, the resolution may be converted after alignment and, when the high-speed process is performed, alignment may be performed after converting the resolution.

In the above description, criteria are prepared separately for two processes, namely, the high-definition process and the high-speed process, but finer divisions may be further prepared; the number of divisions is not particularly limited.

Figure 11:
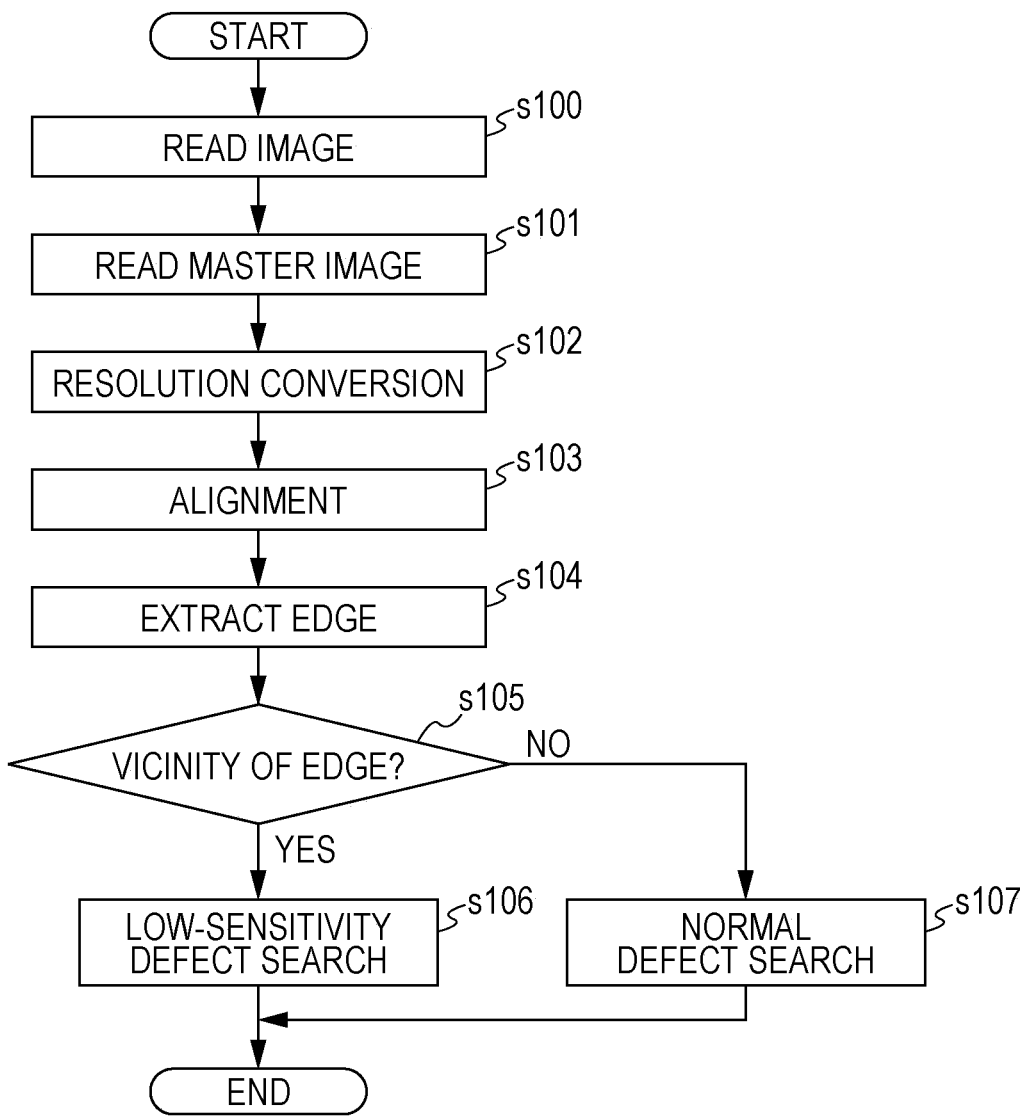
FIG. 11 is a flowchart illustrating a conventional image inspection procedure.

Prior to describing the embodiments of the present invention, a determination procedure in the conventional technology will be described with reference to a flowchart in FIG. 11.

Upon start of the process, the image of a sheet which is a printed matter output after an image is formed thereon is read at an image reader and transmitted to a control part as a captured image (step s100). Subsequently, the control part reads the master image (step s101). The master image can be read by reading information about the correct image retained in a storage or the like. A read image subjected to finished product check or a RIP image can be used as the correct image.

The resolutions of the captured image and the master image are converted to a relatively low resolution (step s102). The resolution targeted by conversion is defined in advance in consideration of processing speed and the like. The present invention is not limited to a specific resolution.

After converting the resolution, the images are aligned (step s103) and the edge of the image is extracted (step s104). Subsequently, it is determined whether a determination section is located in the vicinity of the edge (step s105). When the determination section is located in the vicinity of the edge (step s105, Yes), low-sensitivity defect search is performed (step s106). When the determination section is not located in the vicinity of the edge (step s105, No), normal defect search is performed (step s107). After the defect search in each case, the procedure is terminated.

In the above procedure, the sensitivity to a defect near the edge is lowered and the determination cannot be made with appropriate precision.

Figure 3:
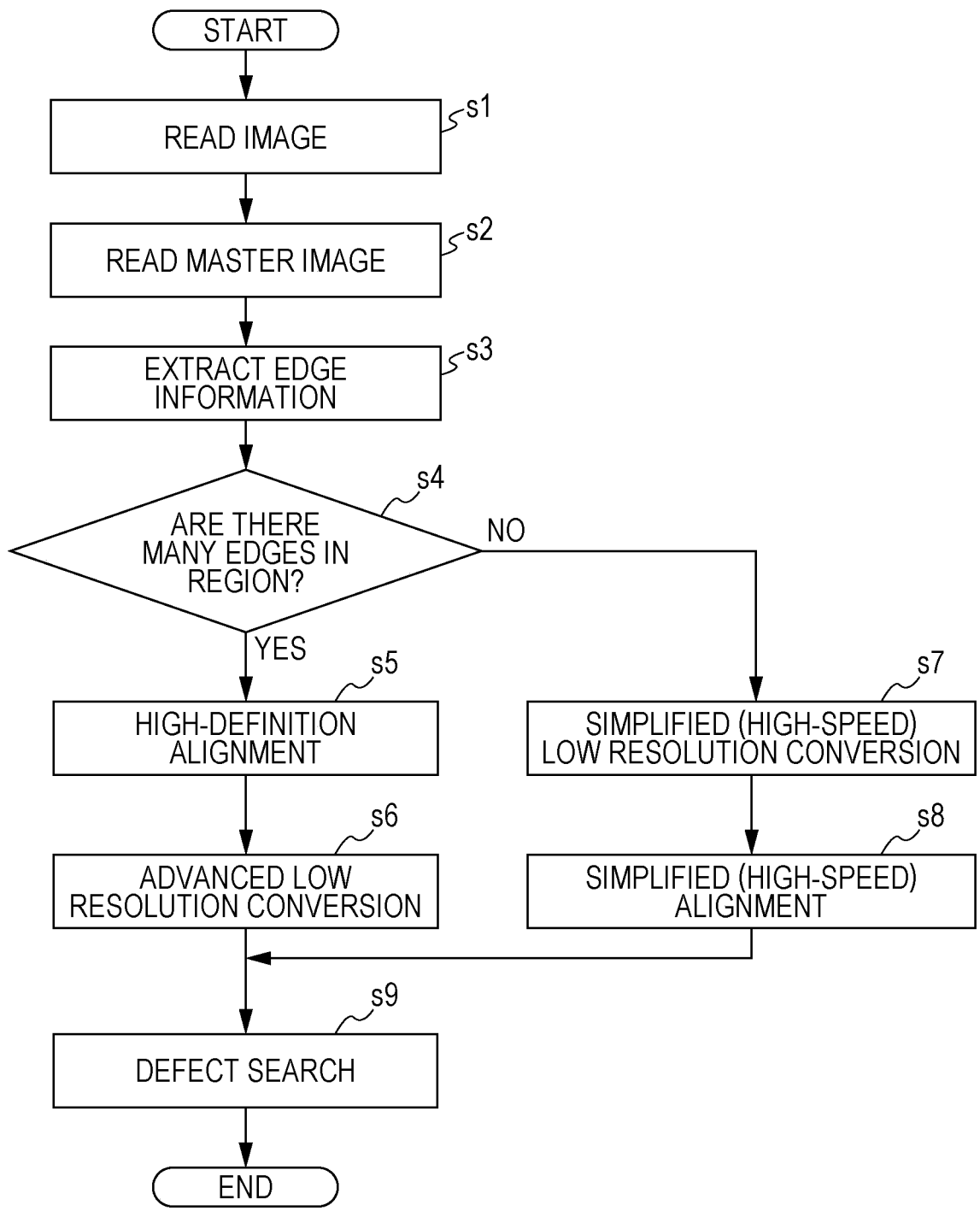
FIG. 3 is, similarly to above, a flowchart illustrating an inspection procedure using edge information as information on an image.

Next, a determination procedure according to an embodiment of the present invention will be described with reference to a flowchart in FIG. 3. The following procedure is executed under the control of the control part.

Note that the present embodiment is characterized in that mainly the image processing technique such as alignment is determined for each region having a predetermined area, depending on which one is to be selected, "processing time is required but precision is higher" or "processing time is shorter but precision is lower".

In this embodiment, the chief point of the determination criterion is the presence/absence of the edge, which is information on the image. A section where erroneous detection is likely to occur in the printing inspection device is the vicinity of the edge. This is the influence of the positional shift and the degree of blurring of the line, which are causes of erroneous detection likely to happen in this section. Therefore, high-precision alignment is required in a region with a lot of edges to suppress erroneous detection and the precision can be low in a region without edges. Note that the present invention is not limited to the inspection method that attaches importance to the vicinity of the edge.

Upon start of the process, the image of a sheet which is a printed matter output after an image is formed thereon is read at the image reader and transmitted to the control part as a captured image (step s1). Subsequently, the control part reads the master image (step s2). A read image subjected to finished product check or a RIP image can be used as the master image.

Next, in the present embodiment, edge information is extracted as information on the image (step s3) and it is determined whether there are many edges in the region (step s4).

In determining whether there are many edges, region information in a predetermined region is extracted from the captured image and the master image, and determination is made for each item of region information. The size and the like of the predetermined region are not particularly limited and different sizes and shapes of regions may be defined depending on the regions.

Whether there are many edges, that is, the intensity of edges can be determined by how much area edges having a size equal to or larger than a certain value occupy in the region. For example, once the determination criterion is defined, it can be determined that there are many edges if the area is larger than the determination criterion, and it can be determined that there are not many edges if the area is equal to or less than the determination criterion.

When there are many edges in the region (step s4, Yes), a high-definition alignment technique is selected and executed (step s5). For example, subpixel alignment, rotation/expansion correction, or the like is performed as the high-definition alignment. The same applies to the following procedures. After the alignment, advanced low resolution conversion is specified and executed as a technique of the image processing method other than the alignment (step s6). For example, a process such as bilinear, bicubic, or non-reduction in resolution is performed as the advanced low resolution conversion. When the high-precision process is performed, the resolution is converted after alignment.

Thereafter, defect search is performed in step s9 and the procedure is terminated after the search. In the defect search, a comparison is made for each region between the captured image and the master image, on which the above processes have been performed, to work out a difference, and whether there is a defect is determined based on the difference. Although it is possible to determine whether there is a defect, for example, by defining a threshold value and depending on whether the difference exceeds the threshold value, the method of determining the defect is not particularly limited in the present invention. Furthermore, a different determination method may be adopted depending on the region. The same applies to the following description.

When it is determined in step s4 that there are not many edges in the region (step s4, No), simplified (high-speed) low resolution conversion is specified and executed as an image processing technique other than alignment (step s7). A technique such as nearest neighbor can be used as the simplified (high-speed) low resolution conversion. The same applies to the following procedures. Thereafter, simplified (high-speed) alignment is specified and executed as an alignment technique (step s8). For the simplified (high-speed) alignment, it is possible to use a technique such as pixel alignment, omission of alignment in the case of movement only in XY or the same color, or omission of alignment for blank region. The same applies to the following procedures.

Note that, when the simplified (high-speed) process is performed, alignment is performed after converting the resolution. Thereafter, defect search is performed in step s9 and the procedure is terminated after the search. In this embodiment, the edge portion where the sensitivity is reduced in the conventional approach can be detected with high sensitivity. Furthermore, the processing speed can be maintained without reducing the sensitivity to defects.

Figure 4:
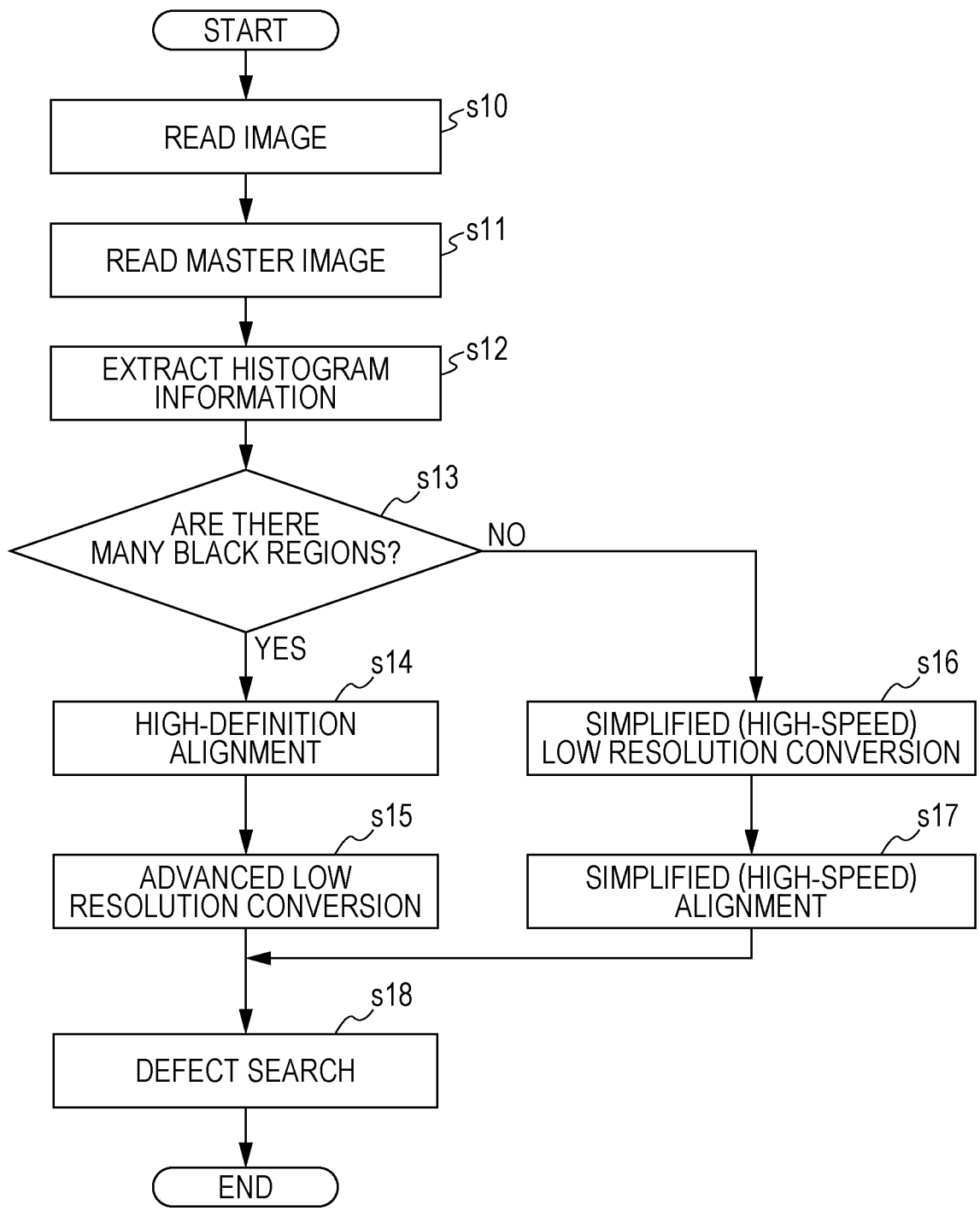
FIG. 4 is, similarly to above, a flowchart illustrating an inspection procedure using histogram information as information on an image.

In the above example, the edge information is used as information on the image, but in another example, histogram information can be used as information on the image. Hereinafter, a procedure in this case will be described with reference to a flowchart in FIG. 4.

Upon start of the process, the image of a sheet which is a printed matter output after an image is formed thereon is read at the image reader and transmitted to the control part as a captured image (step s10). Subsequently, the control part reads the master image (step s11). A read image subjected to finished product check or a RIP image can be used as the master image.

Next, in the present embodiment, histogram information is extracted as information on the image (step s12) and it is determined whether there are many black regions in the region (step s13). In extracting the histogram information, determination is made depending on how much area a specific pixel occupies in the region. For example, in the case of printing on a blank sheet, it can be estimated in the histogram what extent of the sheet is printed.

In this embodiment, the histogram information is extracted focusing on the black region.

In determining whether there are many black regions, region information in a predetermined region is extracted from the captured image and the master image, and determination is made for each item of region information. Note that the size and the like of the predetermined region are also not particularly limited as described above.

When there are many black regions in the region (step s13, Yes), a high-definition alignment technique is selected and executed (step s14). For example, subpixel alignment, rotation/expansion correction, or the like is performed as the high-definition alignment. After the alignment, advanced low resolution conversion is specified and executed as a technique of the image processing method other than the alignment (step s15). For example, a process such as bilinear, bicubic, or non-reduction in resolution is performed as the advanced low resolution conversion. When the high-precision process is performed, the resolution is converted after alignment.

Thereafter, defect search is performed in step s18 and the procedure is terminated after the search. In the defect search, a comparison is made for each region between the captured image and the master image, on which the above processes have been performed, to work out a difference, and whether there is a defect is determined based on the difference.

When it is determined in step s13 that there are not many black regions in the region (step s13, No), simplified (high-speed) low resolution conversion is specified and executed as an image processing technique other than alignment (step s16). A technique such as nearest neighbor can be used as the simplified (high-speed) low resolution conversion. Thereafter, simplified (high-speed) alignment is specified and executed as an alignment technique (step s17). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s18 and the procedure is terminated after the search.

Figure 5:
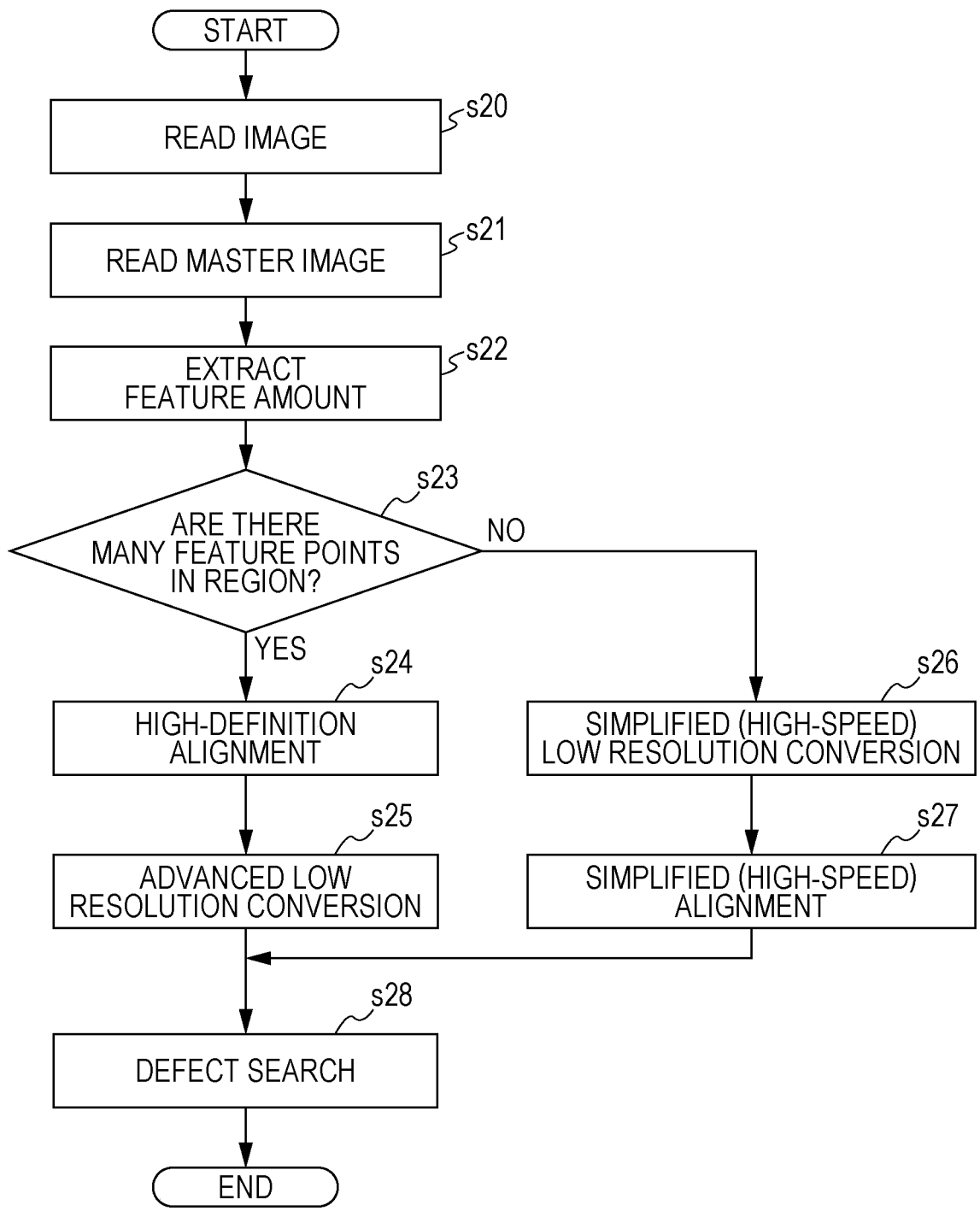
FIG. 5 is, similarly to above, a flowchart illustrating an inspection procedure using a feature amount as information on an image.

Next, a case of extracting a feature amount of an image as information on the image will be described with reference to a flowchart in FIG. 5. The following procedure is executed under the control of the control part.

Upon start of the process, the image of a sheet which is a printed matter output after an image is formed thereon is read at the image reader and transmitted to the control part as a captured image (step s20). Subsequently, the control part reads the master image (step s21).

Next, a feature amount is extracted as information on the image (step s22) and it is determined whether there are many feature points in the region (step s23). For example, with regard to the feature amount, since there are few features in a region with few edges, it is possible to determine the presence/absence of edges by the amount of features.

In determining whether the feature amount is large, feature information in a predetermined region is extracted from the captured image and the master image, and determination is made for each item of region information. Note that the size and the like of the predetermined region are also not particularly limited as described above.

When there are many feature points in the region (step s23, Yes), a high-definition alignment technique is selected and executed (step s24). For example, subpixel alignment, rotation/expansion correction, or the like is performed as the high-definition alignment. After the alignment, advanced low resolution conversion is specified and executed as a technique of the image processing method other than the alignment (step s25). For example, a process such as bilinear, bicubic, or non-reduction in resolution is performed as the advanced low resolution conversion. When the high-precision process is performed, the resolution is converted after alignment.

Thereafter, defect search is performed in step s28 and the procedure is terminated after the search. In the defect search, a comparison is made for each region between the captured image and the master image, on which the above processes have been performed, to work out a difference, and whether there is a defect is determined based on the difference.

When it is determined in step s23 that there are not many feature points in the region (step s23, No), simplified (high-speed) low resolution conversion is specified and executed as an image processing technique other than alignment (step s26). A technique such as nearest neighbor can be used as the simplified (high-speed) low resolution conversion. Thereafter, simplified (high-speed) alignment is specified and executed as an alignment technique (step s27). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s28 and the procedure is terminated after the search.

Figure 6:
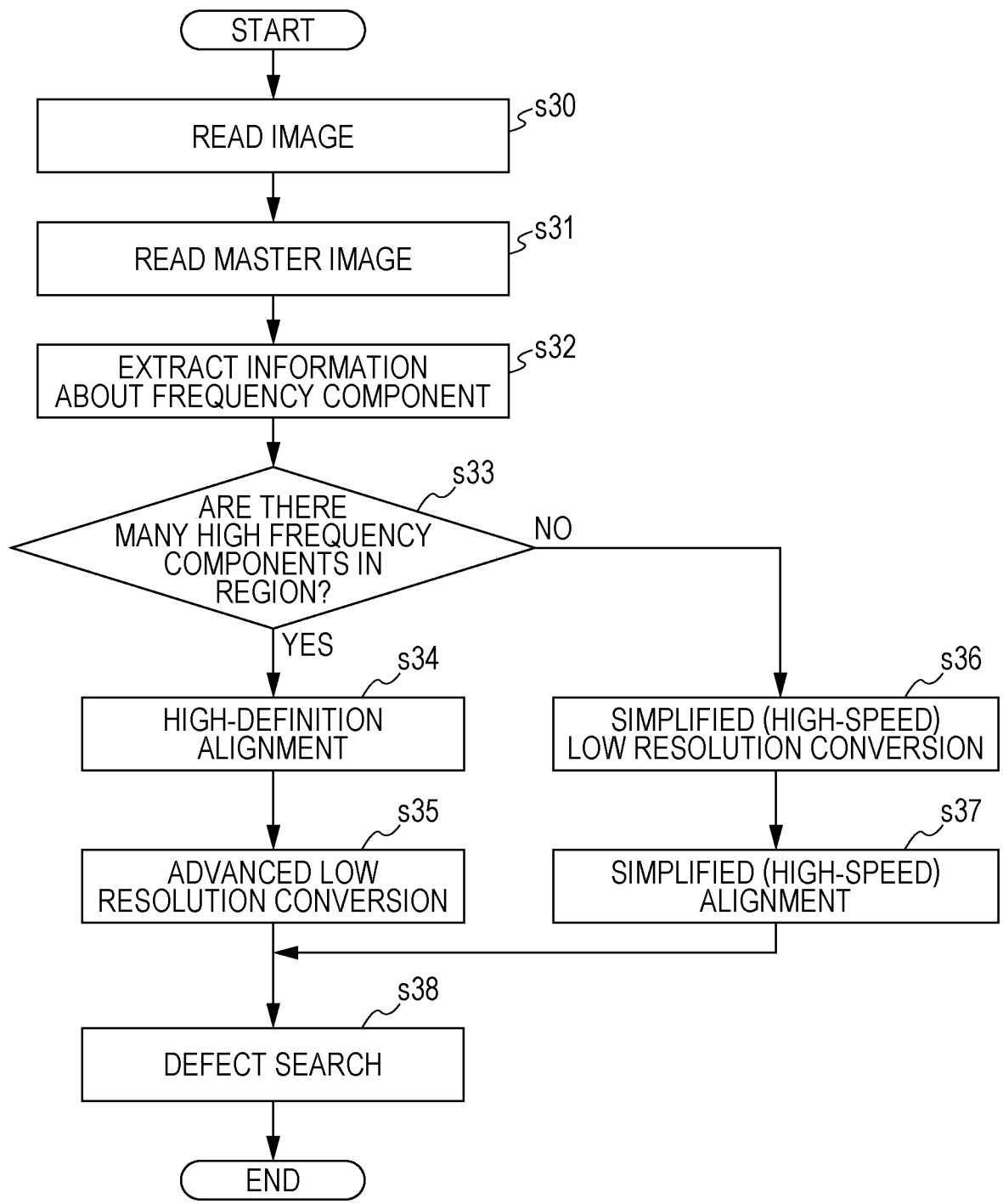
FIG. 6 is, similarly to above, a flowchart illustrating an inspection procedure using frequency component information as information on an image.

Next, a case of extracting the frequency component of an image as information on the image will be described with reference to a flowchart in FIG. 6.

Upon start of the process, the image of a sheet which is a printed matter output after an image is formed thereon is read at the image reader and transmitted to the control part as a captured image (step s30). Subsequently, the control part reads the master image (step s31). A read image subjected to finished product check or a RIP image can be used as the master image.

Next, in the present embodiment, information about the frequency component is extracted as information on the image (step s32) and it is determined whether there are many high frequency components in the region (step s33). As for the high frequency component, a reference of a predetermined frequency is defined in advance and a component exceeding this reference can be regarded as a high frequency component. The predetermined frequency can be appropriately determined and the present invention is not limited to a specific frequency.

The reason for extracting the high frequency component is that, when the image is Fourier transformed and high frequency components of a predetermined frequency are included in a certain quantity or more, it means that there are many edges in the image. Whether or not the high frequency components are included in a certain quantity or more can be appropriately specified in advance and the certain amount is not limited to a specific amount in the present invention.

In determining whether there are many high frequency components, frequency components in a predetermined region are extracted from the captured image and the master image, and determination is made for each item of region information. Note that the size and the like of the predetermined region are also not particularly limited as described above.

When there are many high frequency components in the region (step s33, Yes), a high-definition alignment technique is selected and executed (step s34). For example, subpixel alignment, rotation/expansion correction, or the like is performed as the high-definition alignment. After the alignment, advanced low resolution conversion is specified and executed as a technique of the image processing method other than the alignment (step s35). For example, a process such as bilinear, bicubic, or non-reduction in resolution is performed as the advanced low resolution conversion. When the high-precision process is performed, the resolution is converted after alignment.

Thereafter, defect search is performed in step s38 and the procedure is terminated after the search. In the defect search, a comparison is made for each region between the captured image and the master image, on which the above processes have been performed, to work out a difference, and whether there is a defect is determined based on the difference.

When it is determined in step s33 that there are not many high frequency components (step s33, No), simplified (high-speed) low resolution conversion is specified and executed as an image processing technique other than alignment (step s36). A technique such as nearest neighbor can be used as the simplified (high-speed) low resolution conversion. Thereafter, simplified (high-speed) alignment is specified and executed as an alignment technique (step s37). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s38 and the procedure is terminated after the search.

Figure 7:
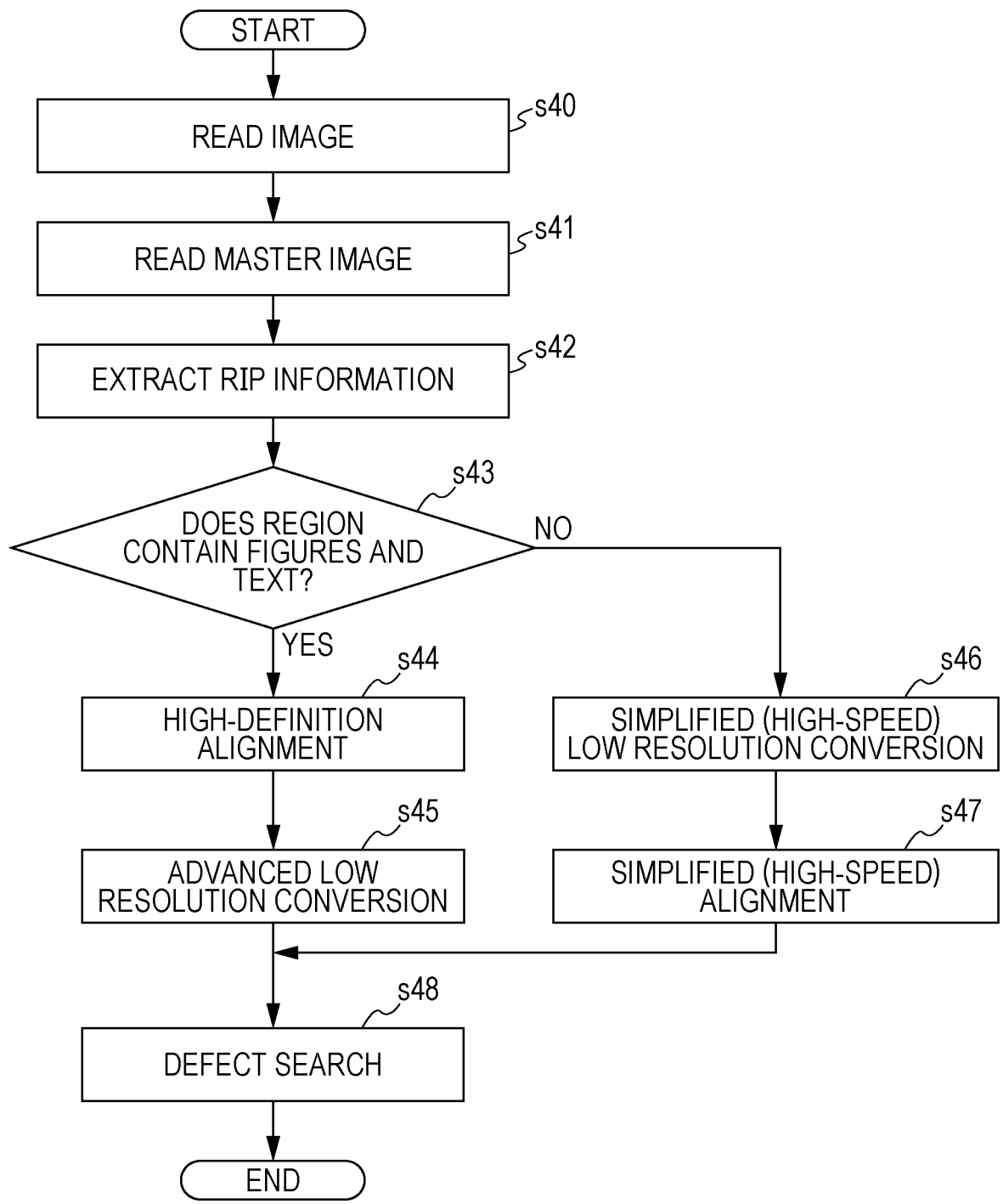
FIG. 7 is, similarly to above, a flowchart illustrating an inspection procedure using RIP information.

Next, a case of extracting RIP information as information on the image will be described with reference to a flowchart in FIG. 7. The following procedure is executed under the control of the control part.

Upon start of the process, the image of a sheet which is a printed matter output after an image is formed thereon is read at the image reader and transmitted to the control part as a captured image (step s40). Subsequently, the control part reads the master image (step s41).

Next, RIP information is extracted as information on the image (step s42) and it is determined whether there are many figures and text in the region (step s43). It can be determined from RIP tag information whether there are many edges in the region. For example, if there are sentences in the region, there are many characters and accordingly it means that there are many edges. Whether there are many figures and text can be determined, for example, by an area ratio.

In determining whether there are many figures/text in the region, RIP information in a predetermined region is extracted from the captured image and the master image, and determination is made for each item of region information. Note that the size and the like of the predetermined region are also not particularly limited as described above.

When there are many figures/text in the region (step s43, Yes), a high-definition alignment technique is selected and executed (step s44). For example, subpixel alignment, rotation/expansion correction, or the like is performed as the high-definition alignment. After the alignment, advanced low resolution conversion is specified and executed as a technique of the image processing method other than the alignment (step s45). For example, a process such as bilinear, bicubic, or non-reduction in resolution is performed as the advanced low resolution conversion. When the high-precision process is performed, the resolution is converted after alignment.

Thereafter, defect search is performed in step s48 and the procedure is terminated after the search. In the defect search, a comparison is made for each region between the captured image and the master image, on which the above processes have been performed, to work out a difference, and whether there is a defect is determined based on the difference.

When it is determined in step s43 that there are not many figures/text in the region (step s43, No), simplified (high-speed) low resolution conversion is specified and executed as an image processing technique other than alignment (step s46). A technique such as nearest neighbor can be used as the simplified (high-speed) low resolution conversion. Thereafter, simplified (high-speed) alignment is specified and executed as an alignment technique (step s47). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s48 and the procedure is terminated after the search.

Figure 8:
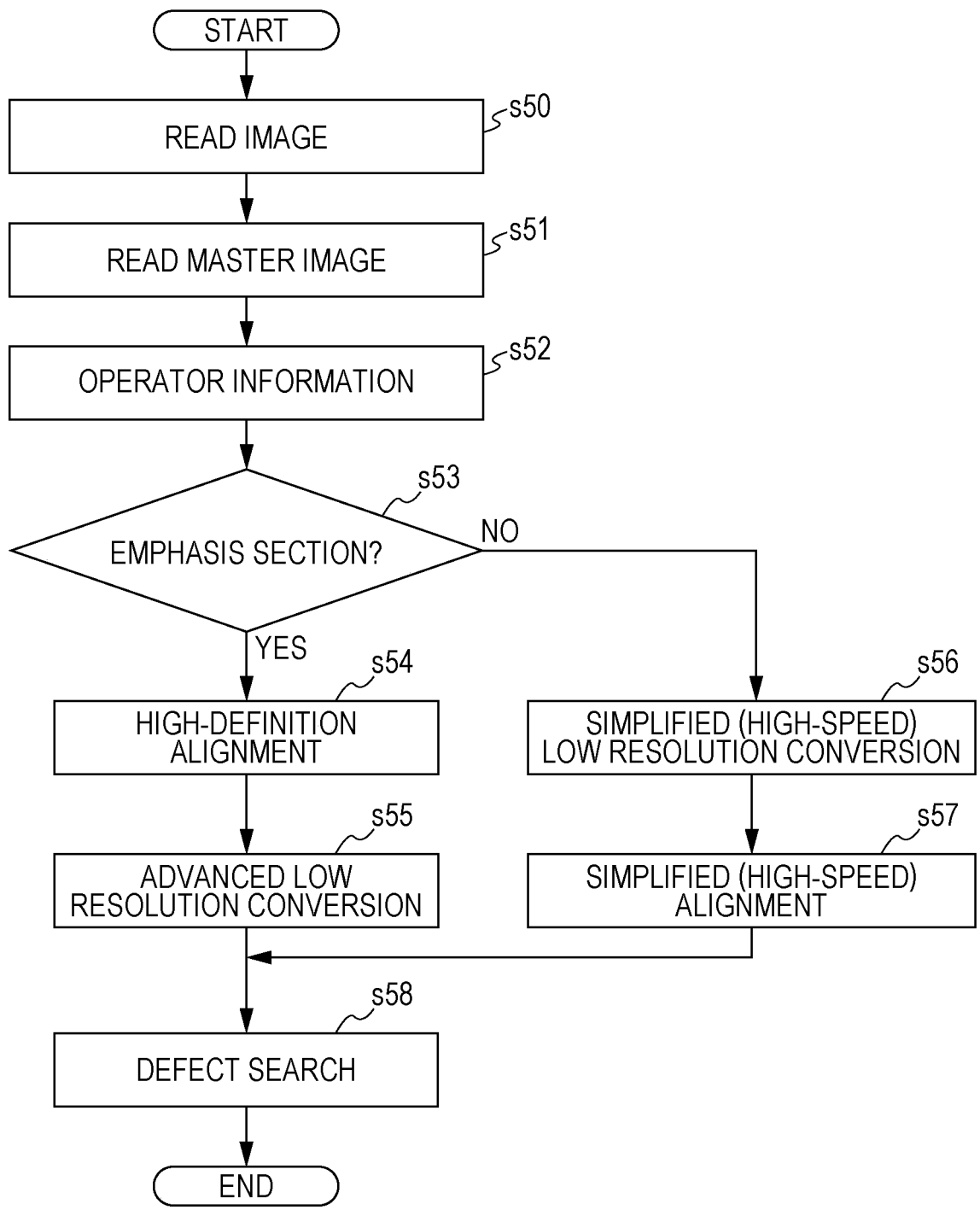
FIG. 8 is, similarly to above, a flowchart illustrating an inspection procedure using operator information.

Next, a procedure of specifying and executing the techniques of alignment and image process based on information from an operator (user) will be described with reference to a flowchart in FIG. 8. The following procedure is executed under the control of the control part.

Upon start of the process, the image of a sheet which is a printed matter output after an image is formed thereon is read at the image reader and transmitted to the control part as a captured image (step s50). Subsequently, the control part reads the master image (step s51).

Next, operator information is acquired (step s52), and it is determined whether an emphasis section is assigned (step s53). The operator information can be designated by the operator via the operation unit or the like and can designate whether an emphasis section is assigned. Alternatively, emphasis information may be set in advance as job information. For example, the operator can mark a region that the operator does not wish to smudge, as region information, for example, by enclosing the region and designate the high-precision alignment to be performed on the marked portion such that erroneous detection is not produced and a defect is not missed in the marked portion.

In determining whether an emphasis section is assigned, determination is made on whether an emphasis section is assigned in a predetermined region in the captured image and the master image. Note that the size and the like of the predetermined region are also not particularly limited as described above.

When an emphasis section is assigned (step s53, Yes), a high-definition alignment technique is selected and executed (step s54). For example, subpixel alignment, rotation/expansion correction, or the like is performed as the high-definition alignment. After the alignment, advanced low resolution conversion is specified and executed as a technique of the image processing method other than the alignment (step s55). For example, a process such as bilinear, bicubic, or non-reduction in resolution is performed as the advanced low resolution conversion. When the high-precision process is performed, the resolution is converted after alignment.

Thereafter, defect search is performed in step s58 and the procedure is terminated after the search. In the defect search, a comparison is made for each region between the captured image and the master image, on which the above processes have been performed, to work out a difference, and whether there is a defect is determined based on the difference.

When it is determined in step s53 that an emphasis section is not assigned (step s53, No), simplified (high-speed) low resolution conversion is specified and executed as an image processing technique other than alignment (step s56). A technique such as nearest neighbor can be used as the simplified (high-speed) low resolution conversion. Thereafter, simplified (high-speed) alignment is specified and executed as an alignment technique (step s57). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s58 and the procedure is terminated after the search.

Figure 9:
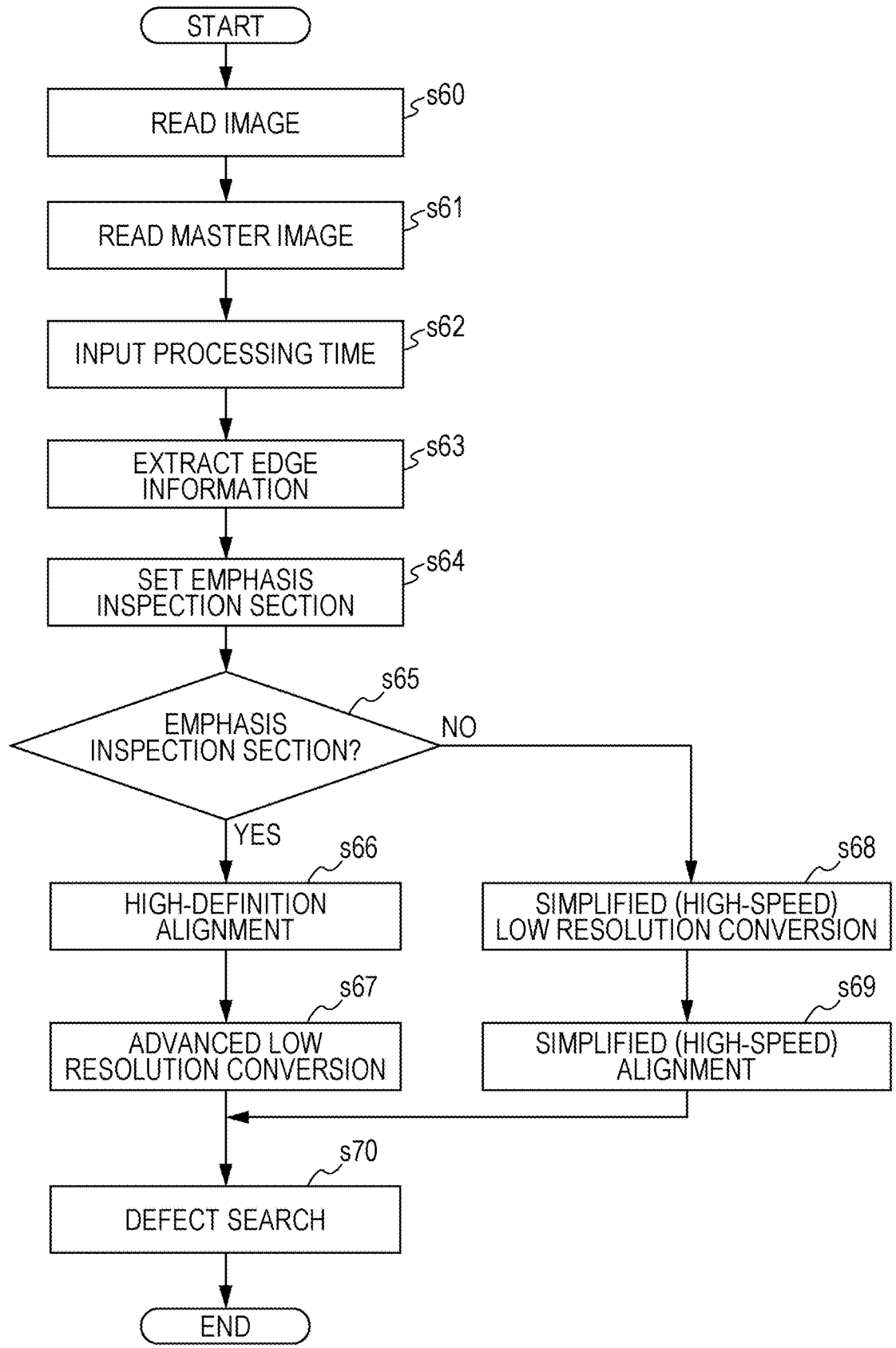
FIG. 9 is, similarly to above, a flowchart illustrating an inspection procedure using processing time input information.

Next, a procedure for the operator to decide the processing time and perform processes will be described with reference to a flowchart in FIG. 9. The following procedure is executed under the control of the control part.

Upon start of the process, the image of a sheet which is a printed matter output after an image is formed thereon is read at the image reader and transmitted to the control part as a captured image (step s60). Subsequently, the control part reads the master image (step s61).

Next, the input of the processing time by the operator for a predetermined region is acquired (step s62). The processing time is input as an upper limit, but the input timing is not particularly limited; the processing time may be input in advance. The processing time can be input by the operator via the operation unit.

Subsequently, the edge information is extracted from the image (step s63) and an emphasis inspection section is set such that a region with more edges is processed earlier in order to complete the process within the processing time (step s64).

In determining whether the emphasis inspection section is assigned, determination is made on whether the emphasis inspection section is assigned for the predetermined region in the captured image and the master image. Note that the size and the like of the predetermined region are also not particularly limited as described above.

When the emphasis inspection section is assigned (step s65, Yes), a high-definition alignment technique is selected and executed (step s66). For example, subpixel alignment, rotation/expansion correction, or the like is performed as the high-definition alignment. After the alignment, advanced low resolution conversion is specified and executed as a technique of the image processing method other than the alignment (step s67). For example, a process such as bilinear, bicubic, or non-reduction in resolution is performed as the advanced low resolution conversion. When the high-precision process is performed, the resolution is converted after alignment.

Thereafter, defect search is performed in step s70 and the procedure is terminated after the search. In the defect search, a comparison is made for each region between the captured image and the master image, on which the above processes have been performed, to work out a difference, and whether there is a defect is determined based on the difference.

When it is determined in step s65 that an emphasis inspection section is not assigned (step s65, No), simplified (high-speed) low resolution conversion is specified and executed as an image processing technique other than alignment (step s68). A technique such as nearest neighbor can be used as the simplified (high-speed) low resolution conversion. Thereafter, simplified (high-speed) alignment is specified and executed as an alignment technique (step s69). For the simplified (high-speed) alignment, it is possible to use a technique such as pixel alignment, omission of alignment in the case of movement only in XY or the same color, or omission of alignment for blank region.

When the simplified (high-speed) process is performed, alignment is performed after converting the resolution.

Thereafter, defect search is performed in step s70 and the procedure is terminated after the search.

Next, the order of the image alignment process and the image process other than alignment, in this case, the resolution conversion process will be described.

Figure 10:
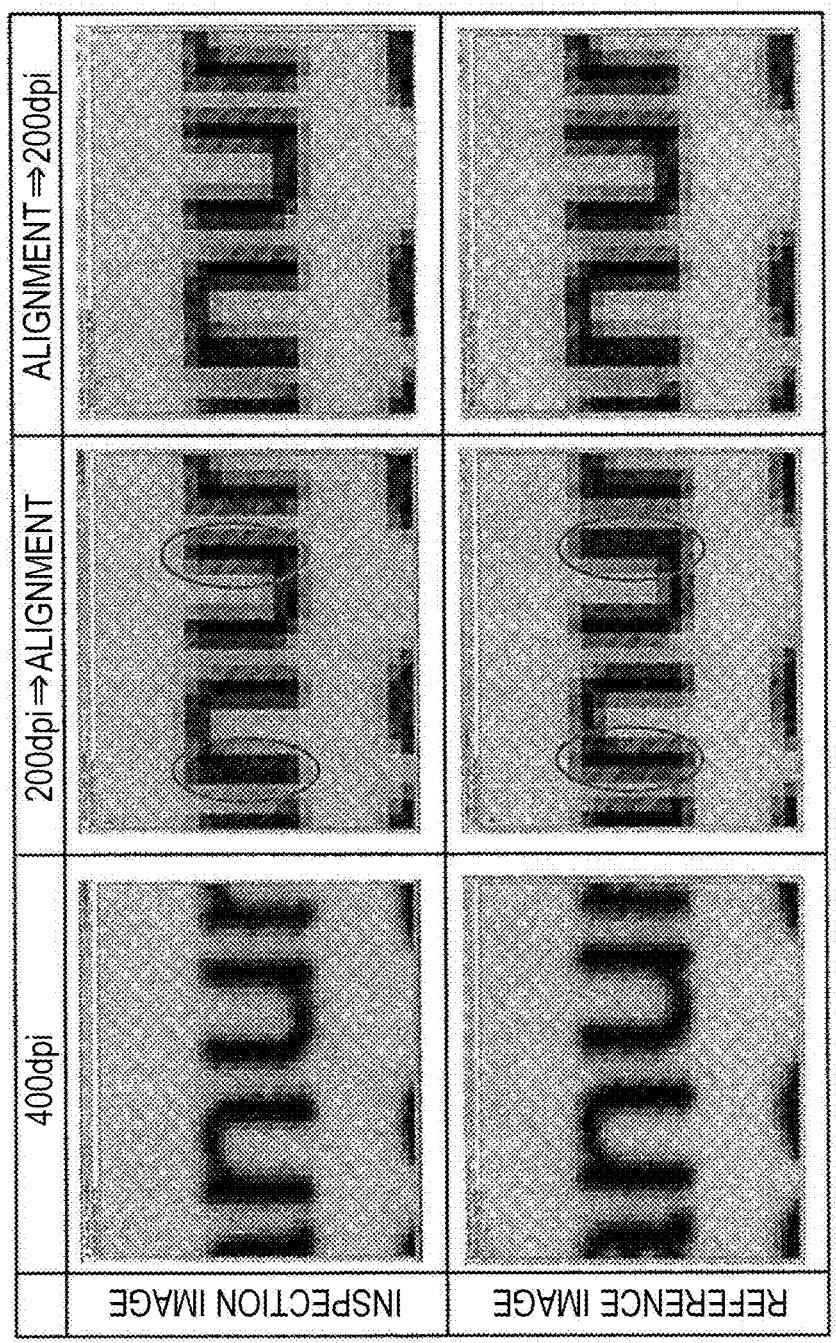
FIG. 10 is, similarly to above, a diagram for explaining variety in images according to the order of resolution conversion and alignment.

As described above, when the high-precision process is performed, the resolution is converted after the images are aligned and, when the simplified (high-speed) process is performed, the images are aligned after the resolution is converted. Examples of these cases are illustrated in FIG. 10. Note that, in these examples, the master image is illustrated as a reference image.

The image on the left side is an image before the image process for inspection is performed, the example at the center is an example in which the images are aligned after converting the resolution, and the image on the right side represents one obtained by converting the resolution after the images are aligned. In the image at the center, the sharpness of the image after the process is impaired and the image on the right side is higher in image sharpness. However, the processing time for the image on the right side is longer than the processing time for the image at the center. Therefore, it is possible to specify the order taking into consideration the precision and speed. Even when the high-precision process is performed or the simplified process is performed, the order of alignment and resolution conversion may be changed to perform the process.

According to an embodiment of the present invention, when an image of a printed matter is inspected, it is possible to compare images by specifying an alignment technique for each region having a predetermined area, and to perform high-precision inspection while minimizing a reduction in the processing speed.

Although embodiments of the present invention have been described and illustrated in detail, the disclosed embodiments are made for purposes of illustration and example only and not limitation. The scope of the present invention should be interpreted by terms of the appended claims. Any modifications can be made to the above embodiments as appropriate without departing from the scope of the present invention.

What is claimed is:

1. An image inspection device that determines a defect in an image of a surface to be inspected of a printed matter, based on a comparison between a captured image obtained by capturing the surface to be inspected and a master image, wherein the master image is a previously prepared correct image,
the image inspection device comprising a hardware processor that acquires the captured image and the master image, wherein
the hardware processor:
individually divides the captured image into a plurality of regions and divides the master image into a plurality of regions;
acquires region information about an image in one of the regions in the captured image and an image in a corresponding region in the master image;
specifies a predetermined processing technique of image alignment from among a plurality of types of processing techniques for the region based on the region information;
executes at least an alignment process in relation to the region information as a process before the comparison by the specified alignment technique; and
compares the captured image and the master image, on which the process before the comparison has been performed, and performs defect determination as to whether there is a defect in the captured image based on a comparison result.

2. The image inspection device according to claim 1, wherein the hardware processor specifies whether a technique of an image process other than the alignment is to be executed and a technique of the image process in relation to the region information and, when the technique of the image process is to be executed, executes the alignment process and the image process as a process before the comparison.

3. The image inspection device according to claim 2, wherein the hardware processor selects at least a technique of resolution conversion as a technique of the image process.

4. The image inspection device according to claim 3, wherein the hardware processor specifies the order of processes of the alignment and the resolution conversion as the process before the comparison.

5. The image inspection device according to claim 1, wherein
the hardware processor:
extracts information on an image from one or both of the captured image and the master image in the region information; and
selects a technique of the process before the comparison based on the information on the image.

6. The image inspection device according to claim 5, wherein the hardware processor extracts edge information in the region when extracting the information on the image.

7. The image inspection device according to claim 6, wherein the hardware processor includes at least edge intensity information into the edge information.

8. The image inspection device according to claim 5, wherein the hardware processor extracts histogram information about the region when extracting the information on the image.

9. The image inspection device according to claim 8, wherein the histogram information includes at least a number of pixels having a specific pixel value.

10. The image inspection device according to claim 5, wherein the hardware processor extracts information about a high frequency component region of a frequency equal to or higher than a predetermined frequency in the region when extracting the information on the image.

11. The image inspection device according to claim 10, wherein the information about the high frequency component region includes at least an area of a region of a frequency equal to or higher than a specific frequency.

12. The image inspection device according to claim 5, wherein the hardware processor extracts image feature amount information from the region information when extracting the information on the image.

13. The image inspection device according to claim 12, wherein the hardware processor uses at least one of an average value, a sum value, a variance, and a standard deviation of a feature amount in the region as the image feature amount information.

14. The image inspection device according to claim 12, wherein the hardware processor uses any one of scale invariant feature transform, Harris, Haar-like, and histograms of oriented gradients as the feature amount.

15. The image inspection device according to claim 1, wherein the hardware processor:
acquires raster image processor (RIP) information for each region from the master image when acquiring the region information; and
selects a technique of the process before the comparison based on the RIP information.

16. The image inspection device according to claim 15, wherein the hardware processor uses RIP tag information when acquiring the RIP information.

17. The image inspection device according to claim 1, wherein
the hardware processor:
allows to acquire information about a region designated by an operator for the captured image and the master image; and
selects a technique of the process before the comparison based on the information about the designated region.

18. The image inspection device according to claim 17, wherein the hardware processor allows to designate a region of interest to be inspected intensively in the information about the region designated by the operator, and uses information about the region of interest for selecting a technique.

19. The image inspection device according to claim 17, wherein the hardware processor allows to designate a target of processing time for inspection in the information about the region designated by the operator, and uses information about the target processing time for selecting a technique.

20. An image forming system comprising an image former that forms an image of a recording medium and the image inspection device according to claim 1.

21. The image inspection device according to claim 1, wherein the plurality of types of processing techniques includes not performing alignment.

22. The image inspection device according to claim 1, wherein the image of the surface includes a plurality of regions, and the hardware processor acquires region information for each of the regions and specifies a processing technique from among a plurality of types of processing techniques for each of the regions.

23. The image inspection device according to claim 1, wherein the hardware processor specifies only one of the plurality of processing techniques based on the region information.

* * * * *